(12) United States Patent
Le et al.

(10) Patent No.: US 11,483,405 B2
(45) Date of Patent: Oct. 25, 2022

(54) PRIVATE CLOUD AS A SERVICE

(71) Applicant: Platform9, Inc., Sunnyvale, CA (US)

(72) Inventors: Bich Cau Le, Menlo Park, CA (US); Paavan Kashinath Shanbhag, Sunnyvale, CA (US); Roopak Parikh, Milpitas, CA (US); Sachin Manpathak, Fremont, CA (US); Robert Frederick Deuel, Menlo Park, CA (US)

(73) Assignee: Platform9, Inc., Sunnyvale, CA (US)

( * ) Notice: Subject to any disclaimer, the term of this patent is extended or adjusted under 35 U.S.C. 154(b) by 440 days.

(21) Appl. No.: 15/178,486

(22) Filed: Jun. 9, 2016

(65) Prior Publication Data
US 2016/0366233 A1  Dec. 15, 2016

Related U.S. Application Data

(60) Provisional application No. 62/230,558, filed on Jun. 10, 2015.

(51) Int. Cl.
*G06F 8/65* (2018.01)
*H04L 67/00* (2022.01)
(Continued)

(52) U.S. Cl.
CPC .............. *H04L 67/51* (2022.05); *G06F 8/61* (2013.01); *G06F 8/65* (2013.01); *G06F 9/5077* (2013.01); *H04L 41/0806* (2013.01); *H04L 41/0843* (2013.01); *H04L 41/0866* (2013.01); *H04L 41/22* (2013.01); *H04L 63/0823* (2013.01); *H04L 63/105* (2013.01); *H04L 67/02* (2013.01); *H04L 67/34* (2013.01); *H04L 41/082* (2013.01); *H04L 43/10* (2013.01)

(58) Field of Classification Search
None
See application file for complete search history.

(56) References Cited

U.S. PATENT DOCUMENTS 7,577,722 B1 * 8/2009 Khandekar ......... G06F 9/45558
709/220
9,256,424 B1 * 2/2016 Kuchibhotla ............. G06F 8/71
(Continued)

*Primary Examiner* — Philip Wang
(74) *Attorney, Agent, or Firm* — Shumaker, Loop & Kendrick, LLP

(57) ABSTRACT

The system provisions and upgrades a private cloud stack from a public cloud application. The system registers and activates installed private cloud stacks to discover names, and software packages. The system enables each private cloud stack's roles for data plane elements and activates a private cloud stack. The system receives connection request from the installed host agent to customer resource manager. The system receives host related information from host agent. The software system stores and pushes the desired state for particular host agent to the host agent. The system installs components on enterprise machine associated with role via host agent. The system configures said installed components using templates and dynamic template parameters. The system receives continuous configuration updates for the installed components and continuous heart beat messages for account manager. The system displays visual alerts via UI for any heartbeat, component install or configuration failures.

8 Claims, 8 Drawing Sheets

(51) Int. Cl.
*H04L 9/40* (2022.01)
*H04L 41/082* (2022.01)
*G06F 8/61* (2018.01)
*H04L 67/51* (2022.01)
*H04L 41/22* (2022.01)
*H04L 41/084* (2022.01)
*G06F 9/50* (2006.01)
*H04L 41/0866* (2022.01)
*H04L 41/0806* (2022.01)
*H04L 67/02* (2022.01)
*H04L 43/10* (2022.01)

(56) References Cited

U.S. PATENT DOCUMENTS

| | | | | |
|---|---|---|---|---|
| 11,403,093 | B1* | 8/2022 | Gandhi | G06F 8/656 |
| 2006/0218548 | A1* | 9/2006 | Mason | G06F 8/61 |
| | | | | 717/174 |
| 2008/0244577 | A1* | 10/2008 | Le | G06F 8/63 |
| | | | | 718/1 |
| 2010/0036889 | A1* | 2/2010 | Joshi | G06F 17/30194 |
| | | | | 707/821 |
| 2011/0191834 | A1* | 8/2011 | Singh | G06F 17/00 |
| | | | | 726/6 |
| 2013/0282908 | A1* | 10/2013 | Bhattiprolu | H04L 47/127 |
| | | | | 709/226 |
| 2014/0278623 | A1* | 9/2014 | Martinez | G06F 8/36 |
| | | | | 705/7.12 |
| 2015/0363236 | A1* | 12/2015 | Manpathak | G06F 9/5016 |
| | | | | 711/160 |
| 2017/0180487 | A1* | 6/2017 | Frank | G06F 11/3688 |
| 2021/0352062 | A1* | 11/2021 | Saravanaperumal | H04L 63/0272 |
| 2021/0409297 | A1* | 12/2021 | Sherazi | H04L 43/065 |

* cited by examiner

PRIVATE CLOUD AS A SERVICE

CROSS REFERENCE TO RELATED APPLICATIONS

The present application claims priority from Provisional Patent Application No. 62/230,558 filed on Jun. 10, 2015, which is incorporated herein by reference in its entirety.

BACKGROUND

Managing virtualization infrastructure in data centers is difficult and time consuming. Data center operations staff has to not only setup and configure multiple instances of complex management software; they also have to upgrade each of these every time they want critical software fixes or new features. In addition, the burden of monitoring their infrastructure falls squarely on the data center administrators.

Further, while Private Cloud Software Stacks (PCSS) such as OpenStack, CloudStack, Eucalyptus and Kubernetes have simplified some aspects of virtualizing infrastructure, they often introduce their own challenges. Different stacks have different strengths and weaknesses, making it difficult to choose one over the over. This disclosure describes a method and system allowing a user to select and easily deploy one or more of those stacks, possibly running several stacks side-by-side. The disclosure also addresses several weaknesses of PCSS products. In particular, OpenStack, a popular stack, itself has many limitations. One of the limitations addressed in this disclosure is that the current implementation of the OpenStack architecture does not allow for deployment of multiple private cloud infrastructures for multiple enterprise customers. Current design of the OpenStack software is for use of one enterprise customer at a time. The disclosure herein addresses one of the problems hindering the deployment of multiple private cloud infrastructures for many enterprises.

BRIEF DESCRIPTION OF THE DRAWINGS

For a more complete understanding of the disclosed subject matter and advantages thereof, reference is now made to the following description taken in conjunction with the accompanying drawings in which like reference numbers indicate like features and wherein.

SUMMARY

Figure 1:
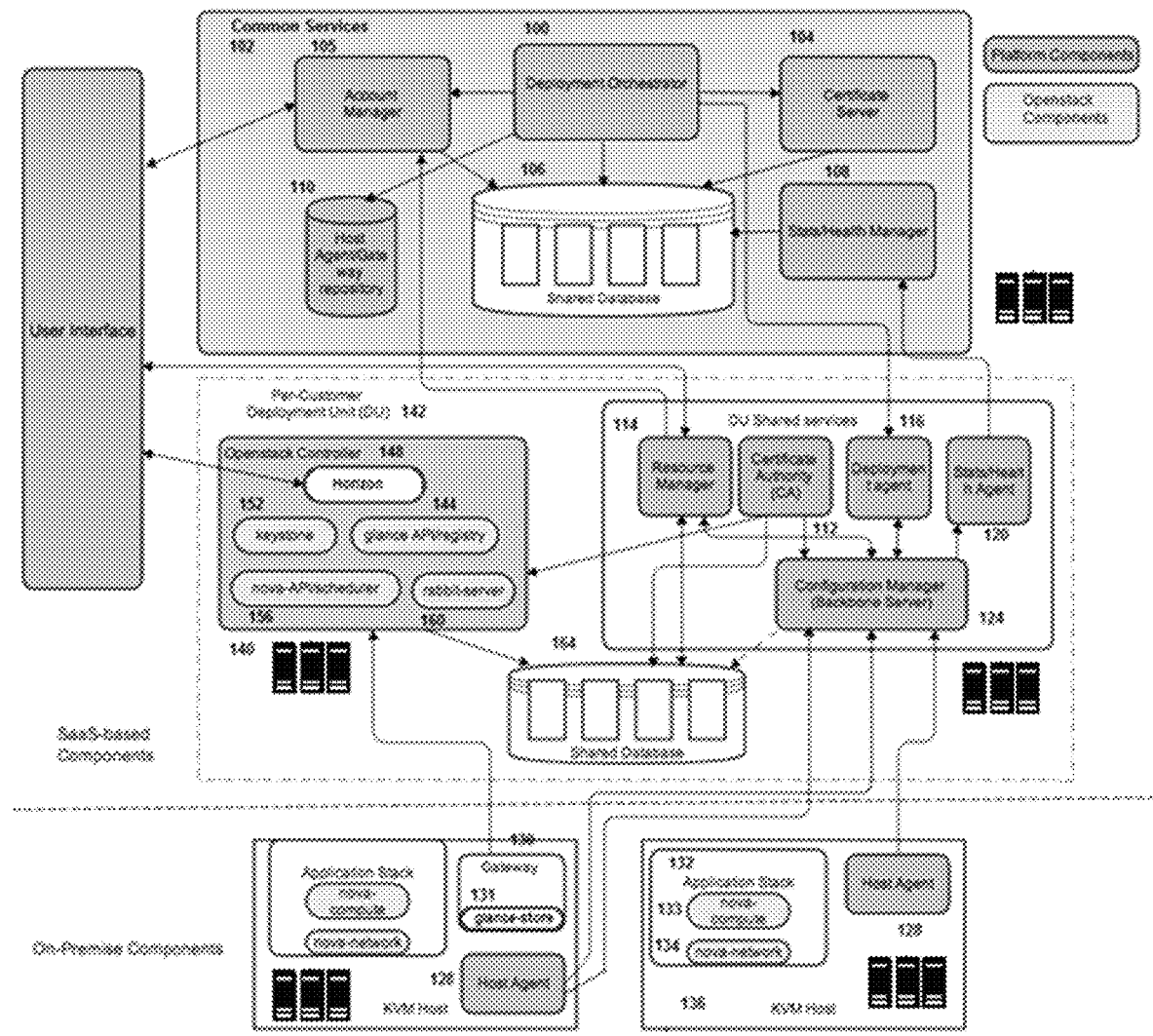
FIG. 1 depicts the architectural diagram for the private cloud as a service and how OpenStack components are used within this architecture.

The system provisions a private cloud stack from a public cloud application. The system registers installed private cloud stacks to discover names, information and software packages through the deployment unit subsystem. The system activates each private cloud stack's control plane services. The system enables each private cloud stack's roles for data plane elements. Then the system reads the private cloud stack's metadata to setup control plane elements as destination connections. The system activates a private cloud stack using an account manager.

The system allows downloading of an agent through a secured website. The system receives agent installation message. The system receives connection request from the installed host agent to customer resource manager. The system authenticates host agent using embedded keys and certificate through the customer account manager. The system receives host related information from host agent. The software system receives a role selection for host agent by the enterprise client. The system receives host information authorization from the customer client. The system stores a desired state for a particular host agent in a database. The software system pushes the desired state for particular host agent to the host agent via an account manager. The system installs components on enterprise machine associated with role via host agent. The system configures said installed components using templates and dynamic template parameters. The system monitors installed component version for their running state. The system receives continuous configuration updates for said installed components. The system receives continuous heart beat messages for account manager. The system receives health messages of installed components for account manager. The system receives configuration health of the components installed messages to account manager. The system displays visual alerts via user interface (UI) for heartbeat, component install or configuration failures.

DETAILED DESCRIPTION

Definitions

Public cloud computing are services rendered over a network that is open for public use and is shared among multiple companies Private cloud computing is a single-tenant environment where the hardware, storage and network are dedicated to a single enterprise/company.

SAAS is a software licensing and delivery model in which software is licensed on a subscription basis and is centrally hosted.

OpenStack—popular private cloud software stack used to manage cloud computing infrastructure.

Implementation

The embodiments disclosed herein are only examples of the many possible advantageous uses and implementations of the innovative teachings presented herein. In general, statements made in the specification of the present application should be interpreted in the broadest form possible. Unless otherwise indicated, singular elements may be in plural and vice versa with no loss of generality.

Exemplary embodiments of the disclosed subject matter are illustrated in the FIGURES, like numerals being used to refer to like and corresponding parts of the various drawings.

The embodiments of the invention enables the use of one or more Private Cloud Software Stacks (PCSS) running on a enterprise computers (with extensive memory) to automate and simplify the management of a customer's private cloud. This disclosure describes in detail how the invention handles and leverages OpenStack, a popular PCSS choice and lesser extend Kubernetes; however the concepts described apply to other stacks as well. Further, current invention provides a unique approach of offering 'private cloud' as a Service by combining a shared private cloud management platform as a service and customer supplying their hardware.

Open source private cloud software, which runs on standard hardware (Linux and/or Windows operating systems), is used to manage cloud computing infrastructure. Private cloud software typically employs multiple layers of software, hence the use of "stack" to describe the overall collection. A PCSS is typically composed of multiple projects for managing specific infrastructure areas. For example, OpenStack uses the Nova project for managing compute infrastructure, Glance for virtual machine images, Swift for object storage, Cinder for block storage, Neutron for networking, etc. Each project has its own layered elements, and can therefore be viewed as a vertical slice of the PCSS. The elements are generally classified in two areas: control plane and data plane. The control plane elements are usually called controller services, and are responsible for monitoring and managing the data plane elements. The data plane elements manage the physical infrastructure resources (e.g. compute servers, storage arrays, network interfaces), and generally need to be in close physical proximity to those resources, i.e. running on the resources or a local network that can reach the resources. They are generally implemented as software agents. For example, in the nova project, nova-api, nova-conductor and nova-scheduler serve as the SAAS controller services, whereas nova-compute serves as the data plane agent. An embodiment of the invention facilitates the deployment of data plane agents through its own agent, called host agent. A private cloud service is a set of Linux/Windows or any other types of computing, storage and network servers located in a data center managed through a management console. Enterprise customers can use a SaaS management console interface to install a host agent onto each server selected for inclusion in the requisite private cloud environment. Once the agent is installed on each server within the private cloud, an end-user can use a management console to setup a virtual machine instance for each server as well as manage the software upgrade process.
Infrastructure as a Service In order to support multiple enterprise customers on a private cloud using OpenStack (or any other PCSS) software components, software as a service (SAAS) platform deploys a set of services in the form of SAAS controller and a gateway and host agent. SAAS is a software licensing and delivery model in which software is licensed on a subscription basis and is centrally hosted. The SAAS based service that controls deployments for one or more enterprise customers, and the host agent/gateway are unique to each customer deployment. FIG. 1 shows the architectural diagram for the private cloud as a service. The architecture of private cloud as a service system is categorized into the following subsystems: common services 102, deployment unit (DU) 142, image library(not shown in FIG. 1), communication framework (not shown in FIG. 1), and a deployment bundle (not shown in FIG. 1). The detail descriptions of the architectural subsystems are described below.
Common Services subsystem Common services subsystem 102 consists of one or more independent software services deployed to monitor and manage the multiple customer deployments units. The common services subsystem is shared among all enterprise customers. Components included in the common services subsystem are the deployment orchestrator 100, account manager, certificate server 104, stat/health manager 108 and host agent/gateway repository 110.

The deployment orchestrator 100 handles end-user requests for first-time account creation. The deployment orchestrator is responsible for deployment and upgrade of deployment units (DU) 142. The deployment orchestrator internally interacts with other components such as account manager, and certificate server to create independent deployment units. The deployment orchestrator works with the host agent 128 to get the deployment units installed on the server machines and get the virtual machine installation up and running. During creation of a new customer deployment, the deployment orchestrator is responsible for creating a new deployment bundle. The deployment orchestrator also gets involved during service upgrade process. It initiates upgrade on each customer deployment via deployment agent and ensures successful automated run of the upgrade process.

Deployment orchestrator uses a combination of tools like Ansible and Boto to create DUs, the product has various drivers for different cloud providers. This enabled deployment orchestrator to deploy on various public or private cloud providers. Deployment orchestrator also provide functionality such as a 'feature' enabler. Various product features can be enabled or disabled at deployment time by deployment orchestrator. These features are optional enhancements or beta improvements to current functionality. Deployment orchestrator is also multi region aware. If there are customers in different region of United States or world. Deployment Orchestrator can determine what is the best location for deployment of the product given customer's location. Deployment Orchestrator takes in following arguments: a release version, a release image, a region and a set of features to be enabled and any other customizable settings that needs to be passed in at deploy time. Deployment orchestrator uses account manager component to store account wide deployments.

Account manager component 105 is responsible for storing and retrieving per-customer account data, licensing and other information into the shared database. Certificate service component 104 in the common services subsystem is responsible for generating per-customer certificates and secrets like account password or random keys Stat/health manager component 108 in the common services subsystem is responsible for monitoring health of customer deployments and ensuring that all services are up and running. The service achieves this goal by means of per-DU stats/health agent instances which report per-customer deployment status. Host agent/gateway repository 110 stores host agent and gateway installation modules ready to be stamped with unique customer identity and packaged to be installed on the data center servers.
Deployment Unit (DU)

A deployment unit (DU) 142 is a logical instance of software services deployed for a given customer in the SAAS cloud computing environment. SAAS based cloud computing environment contains large number of computer processors with shared memory space. The deployment unit contains one or more SAAS based services that communicate with one or more entities (host agents, PCSS agents, gateway nodes) deployed inside enterprise customer data center. The SaaS based services include the controller services of PCSS stacks. The data center servers do not access this node directly, but they may see API endpoints or HTTP URLs that are serviced by this node. DU has a deployment agent 116, certificate authority 112 (discussed below), resource manager 114, stat/health agent 120, configuration manager 124, OpenStack controller 148 and a shared database 164. The DU components runs in a public cloud which is a large number of computers with processors and memory components.

The resource manager 114 within the deployment unit is an independent service that is responsible for management of resources (compute/storage/networking/other) of which are deployed into the private cloud. Sets of PCSS controller services such as OpenStack Controller 148 consume resources managed by the resource manager. When setting up the private cloud, the customer interacts with the resource administration user interface which in turn interacts with the resource manager to help select a subset of compute/storage/networking resources that are part of his data center to be part of the private cloud. The resource manager 114 discovers information about customer environment via the backbone server 124. The resource manager stores the state regarding customer resource selection to the database and works with configuration manager to create an inventory of resources that will be part of the private cloud.

The configuration manager 124 is responsible for the installation, configuration and upgrade of the application software deployed both within the DU and in the customer data center, and discovery of customer resources such as hypervisors and gathering of stats info on these resources. A hypervisor or virtual machine monitor (VMM) is a piece of computer software, firmware or hardware that creates and runs virtual machines.

The OpenStack controller 148 within the DU contains all the OpenStack controller services and components that the SAAS platform wishes to deploy in the DU to enable OpenStack-based private cloud. This will include OpenStack components such as keystone 152, nova-api/nova-conductor/nova-scheduler 156, glance-api/glance-registry 144, rabbit-server 160, neutron, cinder-scheduler, etc. Any OpenStack data plane components such as nova-compute agent 133, cinder-volume (not shown in FIG. 1) deployed on-premise in the customer data center (as part of Application Stack) will initiate connection with the OpenStack SAAS Controller 148 to register with the Controller as compute 133, storage (not shown in FIG. 1), or network 134 nodes.

Managing Multiple Private Cloud Software Stacks

This embodiment of the invention allows a customer to select one or more PCSS to deploy in their data center. Multiple PCSS can be deployed and co-exist in the same data center. To support those scenarios, the DU is capable of holding multiple PCSS software bundles, one for each supported PCSS. A bundle includes: metadata describing the PCSS, software packages containing the PCSS's control plane elements (i.e. controller services), software packages containing the PCSS' data plane elements (e.g. agents), and metadata describing roles and mapping the roles to the data plane elements.

Figure 7:
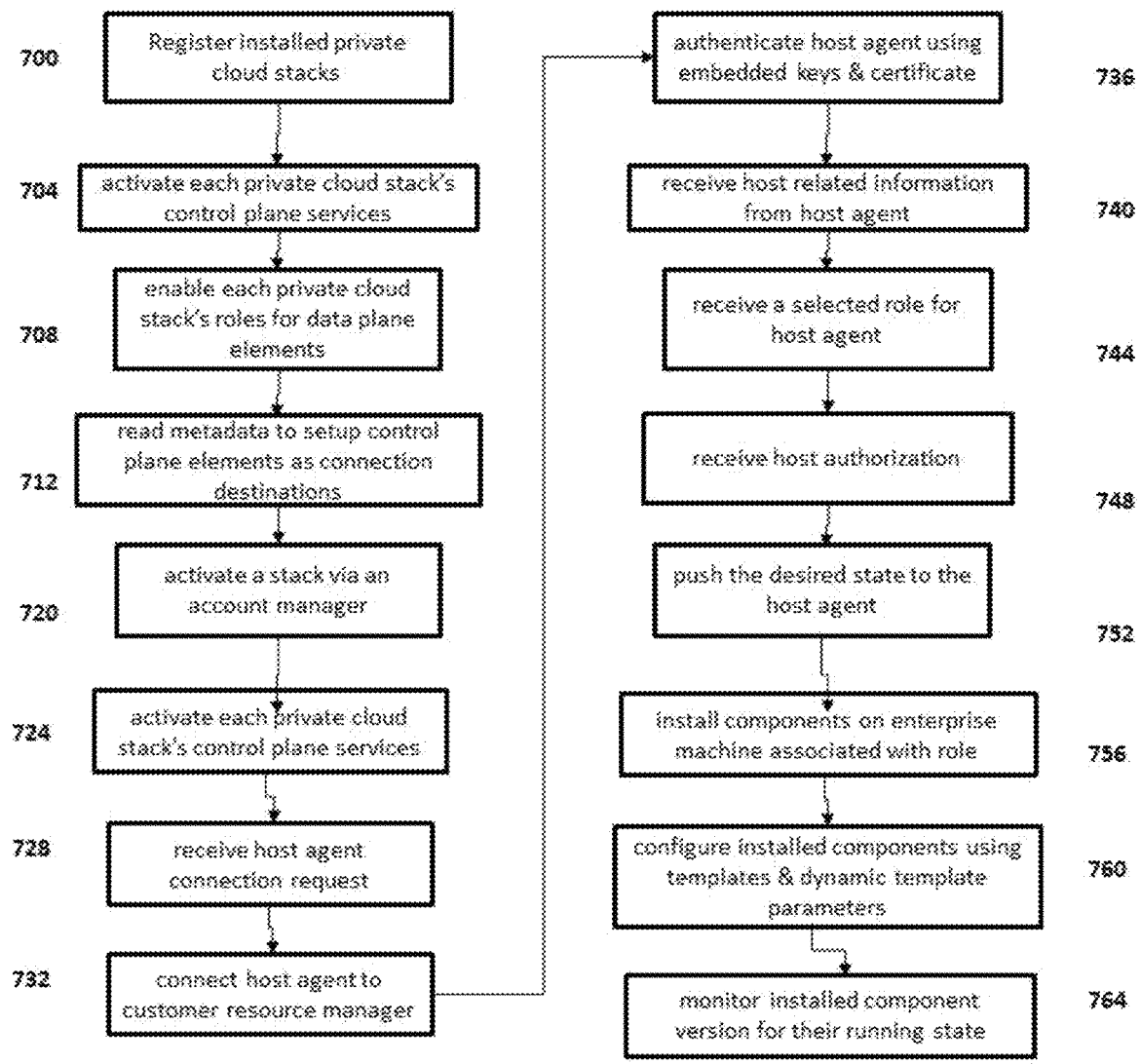
FIG. 7 a detailed work flow of provisioning of the private cloud.

FIG. 7 shows detail steps of registering a PCSS stack within the DU. When DU starts up, DU registers the private cloud stack at DU startup 700. Then the DU activates each clouds control plan services 704. The system enables each private cloud stack's roles for data plane elements. DU also reads the metadata of each installed PCSS bundles 712 to discover its name, information, and associated software packages. DU then activates each private cloud stack's control plan services. Through the SaaS management console, the customer can view available stacks, and may choose to activate or deactivate specific stacks. When a stack is active: (1) the DU ensures that the stack's control plane elements (e.g. controller services) are active in the DU; and (2) the roles associated with the stack's data plane elements (e.g. agents/applications) are available when a customer assigns a role to a server in the data center through the host agent. The PCSS bundle metadata includes information specifying which of the control plane elements can accept incoming connections from data plane elements. The DU reads this metadata to register the right connection subtype tags with the switcher, allowing the control plane elements to act as destinations for the connections they are interested in. The system activates the private stack via an account manager 720.

Data Center Server Installed Components

One or more on-premise components will be deployed in the enterprise data center servers which will help the DU control and manage customer private cloud deployments. The enterprise data center servers are computers with processors of each with its own separate memory. The on-premise components for the system are made up of a host agent 128 and a gateway 130.

The host agent allows deployment unit controller to control resources deployed in the data center environment, and manage and configure required software components (called applications) on these servers. One instance of host agent will be deployed per host in the customer environment. This agent 128 is responsible for discovery of basic properties of that host as well as deployment and configuration of any applications that SAAS platform needs to configure on that host.

Once deployed, the host agent 128 is configured to initiate communication with the DU's configuration manager 124. From then onwards, the configuration manager controls the host agent. The communication of host agents with the configuration manager depends on customer environment.

Host Agent Deployment

The host agent installation contains all the information needed to communicate with the other OpenStack components in the public cloud.

Figure 2:
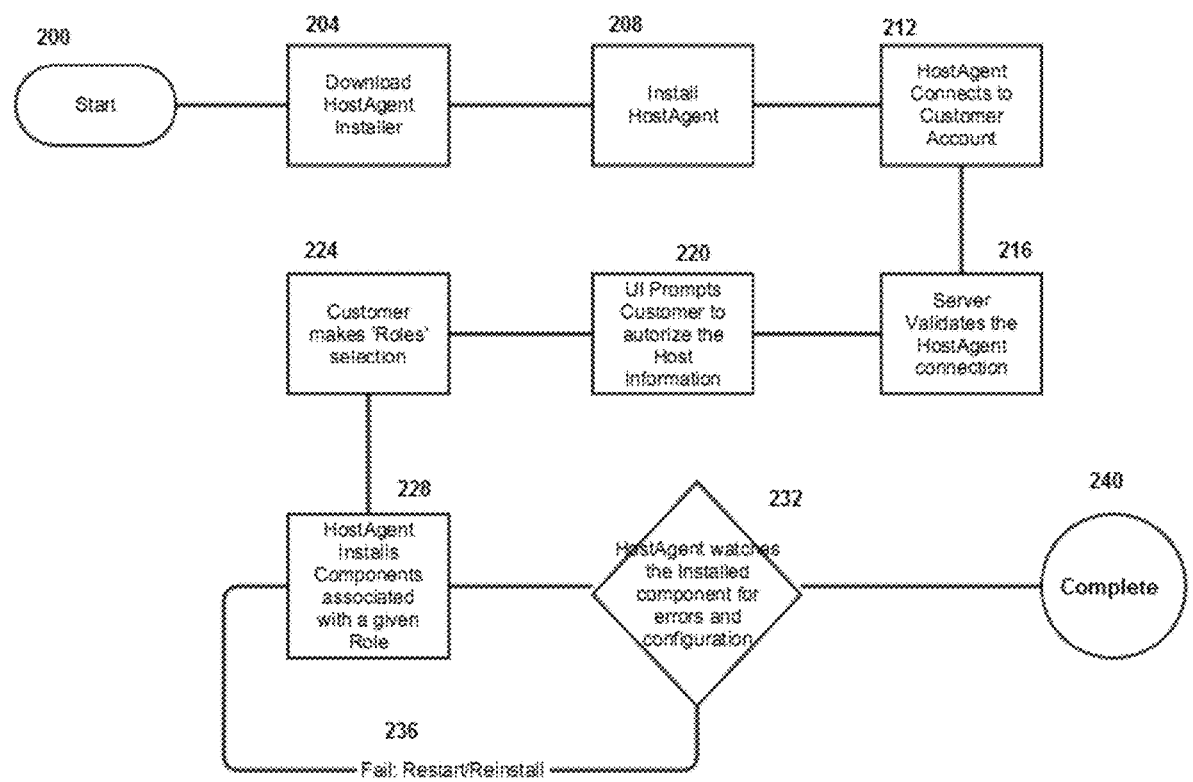
FIG. 2 depicts a work flow of the provisioning of private cloud.

FIG. 2 describes how the host agent is installed on a server within a data center and how the private stack is deployed on the server. FIG. 7 also describes detailed process for deploying the private cloud. After the host agent software has been downloaded 204, a system administrator manually installs the host agent on a server 208 on premise in the enterprise customer's data center. When it boots up, host agent starts communicating with the SAAS controller 212. This can be achieved by setting up a communication channel from the internal end-point (agent installation inside the enterprise infrastructure) to the externally visible endpoint (SAAS controller).

Once the SAAS controller is able to communicate with the host agent 728, SAAS platform connects the host agent to the customer resource manager 732. The SAAS platform also validates the host agent connection using host agent's embedded keys and certificate 216, 736. The administrator authorizes that the host information such as the machine name, IP address and amount of memory from the host agent is correct 220, 740. Then the administrator can choose/determine the "Role" associated with the host server 224, 744. Roles are defined in the SAAS platform, so that a particular set of PCSS data plane software agents are installed based on a particular role being assigned to the host server. The platform pushes the desired state to the host agent 752. Host agent then installs the software associated with the role 228, 756. If the installation software fails to install or the OpenStack software fails to start, host agent re-installs the OpenStack software or restart the OpenStack software 236. The SAAS controller can also update various configurations on the manage server using the agent communication. The host agent configures the installed PCSS components using templates and dynamic template parameters 760.

Host agent also installs and monitors various other PCSS components (such as the nova-compute, cinder-volume, nova-network) 764 and acts as a watchdog (for any failed application upgrades) and configuration management system. The host agent monitors installed component version for their running state. The SAAS platform receives configuration health of the PCSS components. The SAAS platform displays visual alerts for heartbeat, component install or configuration failures.

Figure 8:
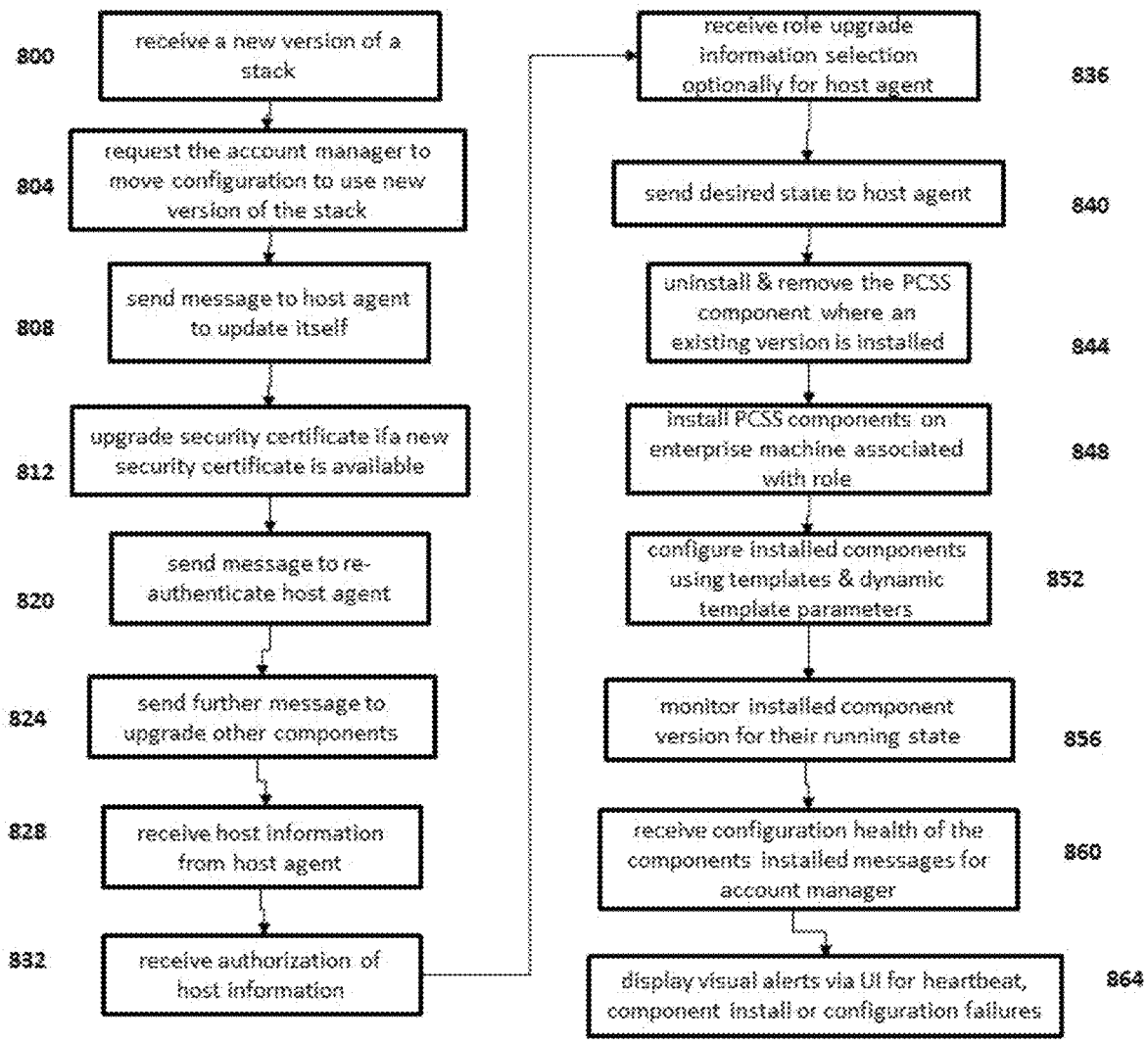
FIG. 8 a detailed work flow of upgrading of the private cloud.

Host Agent and Application Upgrade:

This section describes the upgrade process. Once the host agent is installed and deployed (as described above), host agent connects back to customer specific SAAS controller. FIG. 8 describes a detail process for upgrading the private cloud stack. SAAS platform performs regular updates to the private cloud to fix bugs and include new software features. These upgrade may need downtime to the private cloud, and is typically communicated to the customers. SAAS platform receives a new version of the PCSS stack 800. The account manager moves to use the new version of the private stack 804. The SAAS platform sends a message to the host agent to update itself 808.

Once the SAAS platform has been upgraded, SAAS platform sends the new version number for the cloud stack to the host agent. Once the host agent notices the difference in the installed vs desired version number of host agent, host agent upgrades itself. The host agent upgrades the security certificate if a new security certificate is available 812. The SAAS platform receives messages to re-authenticate the host agent 820. The SAAS platform sends further message to upgrade other PCSS components 824. The actual software upgrade is performed using the Linux operating system specific utilities like yum or apt or the corresponding Windows upgrade utility.

Once it is upgraded, host agent looks for other applications/agents which need to be installed and/or upgraded and removes the existing version and installs a newer version. Host agent sends host information to the SAAS platform. The SAAS platform authorizes the host machine 832. If needed, the host agent receives a role upgrade for the PCSS stack 836. The host agent receives a desire state from the SAAS platform 840. The host agent uninstalls the PCSS components if the existing version already exists 844. The host agent install PCSS components on the enterprise machine associated with the role 848. The host agent configures installed components using templates and dynamic template parameters 852.

In case the upgrade fails, host agent reports back any errors (as a watchdog) and log necessary debugging information to help diagnose these failures. The host agent monitors installed component version for their running state 856. The SAAS platform receives configuration health of the PCSS components 860. The SAAS platform displays visual alerts for heartbeat, component install or configuration failures 864.

Dynamic Configuration is, one of the interesting thing host agent performs, 'dynamic configuration' of applications/agents. Each application/agent has two parts: an installed component and a 'configuration' object. A configuration object is a JavaScript Object Notation (JSON) data structure with variables. JSON uses human-readable text to transmit data objects consisting of attribute-value pairs for asynchronous communication. These variables are populated at the configuration time. Once an application is deployed by a host agent, it runs independently. The application/agent can be configured dynamically by host agent through its own set of commands. For example, the information about what internet protocol (IP) address to use for accepting peer servers command is one instance where the configuration is updated based upon user's action on software platform SAAS user interface (UI). Following json data structure describes an example configuration for an application:

```
{
    role_name: "pf9-ostackhost",
    display_name: "Openstack host",
    description: "Host assigned to run OpenStack Software",
    customizable_settings:
    {
        instances_path:
        {
            path: "config/nova/DEFAULT",
            default: "/opt/pf9/data/instances/"
        },
        novncproxy_base_url:
        {
            path: "config/nova/DEFAULT",
            default: ""
        }
    },
    rabbit_permissions:
    {
        config: "^(nova|compute|compute_fanout|compute\..*|compute_fanout_.*|
            reply_.*)$",
        write: "^(nova|compute|compute\..*|compute_fanout_.*|reply_.*)$",
        read: "^(nova|compute|compute_fanout|compute_fanout_.*|compute\..*|
            reply_.*)$"
    },
    role_version: "__ROLE_VERSION__",
    config:
    {
        pf9-ostackhost:
        {
            service_states:
```

```
                    {
                        pf9-ostackhost: true,
                        pf9-novncproxy: true
                    },
                    version: "_ROLE_VERSION_",
                    url: "https://%(host_relative_amqp_fqdn)s:9443/private/pf9-ostackhost-
                        _RPM_VERSION_.x86_64.rpm",
                    config:
                    {
                        nova:
                        {
                            DEFAULT:
                            {
                                host: "%(host_id)s",
                                rabbit_host: "localhost",
                                rabbit_userid: "%(rabbit_userid)s",
                                rabbit_password: "%(rabbit_password)s",
                                ec2_dmz_host: "localhost",
                                glance_api_servers: "https://localhost:8443/glance",
                                xvpvncproxy_base_url: "http://localhost:6081/console",
                                s3_host: "localhost",
                                flat_interface: "eth0",
                                compute_driver: "libvirt.LibvirtDriver",
                                connection_type: "libvirt",
                                report_interval: "60"
                            },
                            spice:
                            {
                                html5proxy_base_url: "http://localhost:6082/spice_auto.html"
                            },
                            libvirt:
                            {
                                inject_partition: "-1"
                            },
                            workarounds:
                            {
                                destroy_after_evacuate: "True"
                            }
                        }
                    }
                }
            }
        }
    }
}
```

Managing Another PCSS—Kubernetes

Figure 6:
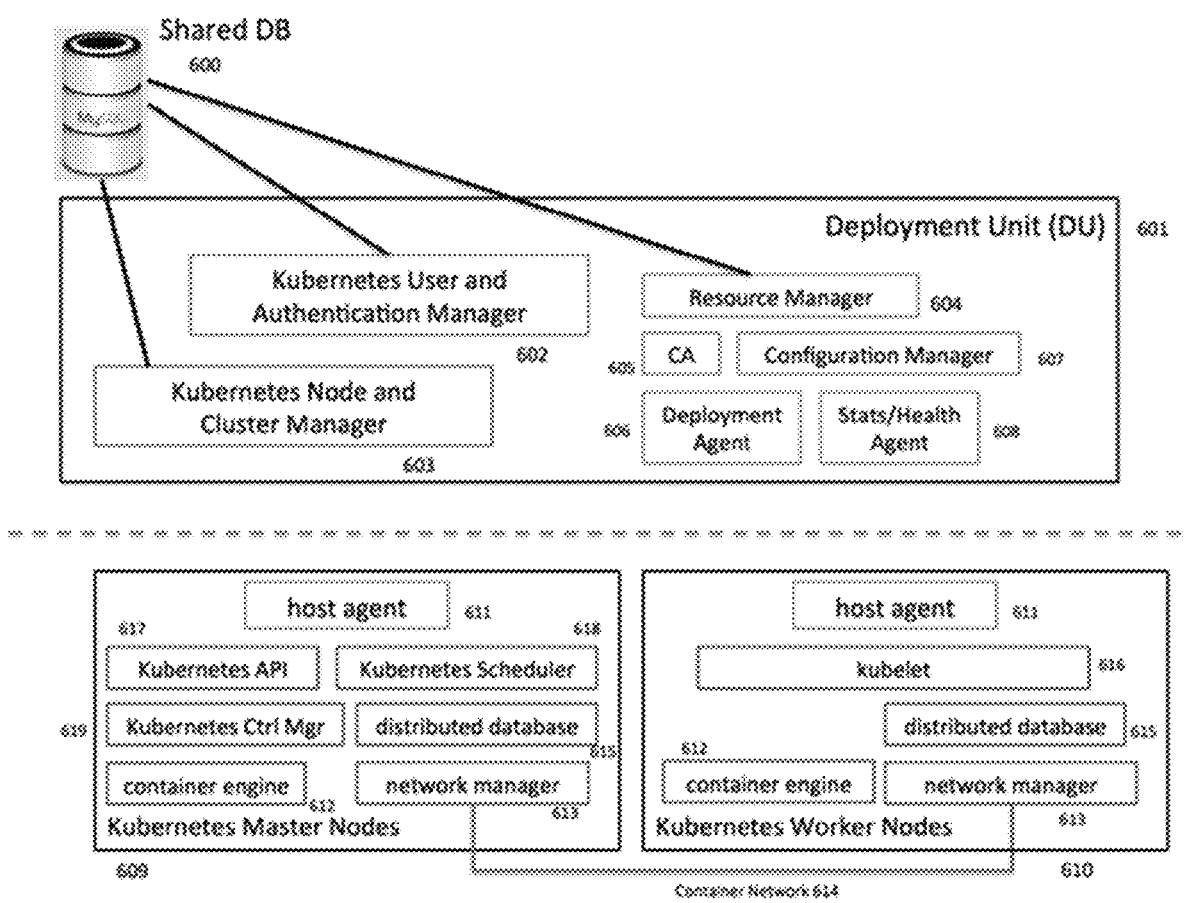
FIG. 6 illustrates the components of an alternate PCSS called Kubernetes.

FIG. 6 illustrates the components of an another PCSS called Kubernetes, which is seamlessly managed within the system. Kubernetes PCSS enables workloads to be deployed in components called containers, which can be thought of as lightweight virtual machines. The Kubernetes PCSS allows the creation of one or more Kubernetes clusters on a user's data center hosts. In Kubernetes terminology, a host is called node. A node can take the role of a worker node, a master node, or both. The control plane elements of a Kubernetes PCSS run in a deployment unit 601 and include a User and Authentication Manager 602 and a Node and Cluster Manager 603. The DU also hosts the same DU Shared Services that are common to all PCSS stacks, including the resource manager 604, certificate authority 605, configuration manager 607, and stats/health agent 608.

The control plane and other DU elements can store their state in shared database 600. The Kubernetes data plane elements comprise a common set of components which are deployed on all nodes, a set of master components which are deployed on master nodes, and a set of worker components which are deployed on worker nodes. The common set includes a container engine 612 (e.g., Docker or Rocket), a distributed database 615 (e.g., Etcd and Consul), and a network manager 613 (e.g., Flannel). The network manager is responsible for creating a container network 614 allowing containers on different nodes to communicate. Each worker node has a service called Kubelet (616) which is responsible for obtaining from the master node(s) a list of containers to run. Kubelet interacts with the container engine to try to ensure that the containers specified by the master node(s) are always running.

The services specific to a master node includes an API server 617, a scheduler 618, and a controller manager 619. Together with other master nodes in the same cluster, they respond to API requests, manage the state of the cluster, and communicate with Kubelets to ensure the right containers are running on the right nodes. The state of the cluster itself is stored in a distributed key-value store managed by the distributed database component of each node in the cluster. To take advantage of Kubernetes, a user interacts with the Kubernetes Node and Cluster Manager to define one or more clusters. When first defined, a cluster is logically empty. The user then installs the host agent on one or more data center hosts. He/she then authorizes the hosts with the Kubernetes role, and specifies which cluster the host/node should be added to. The Node and Cluster Manager can automatically decide whether to make a new node a master or a worker; it can also let the user choose. Once the master/worker role is decided for a host/node, the node and cluster manager coordinates with the resource manager and configuration manager to deploy, install, and configure the correct data plane components to the host/node with the help of the host agent 611 running on each host.

Virtual Machine (VM) Discovery Process

OpenStack open source software is meant to manage a private cloud. This private cloud typically works in a 'greenfield' environment—typically entirely new, separate network segments where a particular private cloud is setup from ground-up with specific configuration done to run OpenStack services. This is a great model for companies deploying an isolated 'private-cloud' environment, but doesn't address already virtualized application and components. Today virtualization is ubiquitous and every company already has majority of their workload virtualized. SAAS platform takes a unique approach to this and adds components and services to OpenStack open source software to make it easy to recognize existing virtualized environments. There are 3 major parts to the discovery:

a. Discovery of existing networks.
b. Discovery of existing images
c. Discovery of existing virtual machines.

a. Discovery of Existing Networks:

a.1 Kernel-Based Virtual Machine (KVM) Virtual Machines

SAAS platform agent discovers various linux bridges configured on each 'hypervisors'. A Linux bridge is a piece of software used to unite two or more network segments. Each linux-bridge name is 'assumed' to be named uniquely across a customer's private cloud and assumed to form a Level (L2) network. L2 network is the second layer of the seven-layer OSI model of computer networking. This layer is the protocol layer that transfers data between nodes on the same local area network (LAN) segment. This follows best-practices among organization to configure servers similarly across their server configuration.

The discovery of bridges on linux is done through the use linux bridge utility (brctl), brctl can be used to show not only the bridges but also all the interfaces associated with them.
Example:
List of bridges and associated interfaces:

| > brctl show | | | |
|---|---|---|---|
| bridge name | bridge id | STP | enabled interfaces |
| br_lab | 8000.089e01ab5498 | no | eth0 |
| | | | vnet0 |
| | | | vnet1 |
| | | | vnet11 |

List of mac addresses associated with a given bridge

| > brctl showmacs br_lab | | | |
|---|---|---|---|
| port no | mac addr | is local? | aging timer |
| 1 | 00:18:0a:07:19:44 | no | 0.00 |
| 1 | 00:18:0a:92:c8:70 | no | 18.38 |
| 1 | 00:18:0a:92:cb:80 | no | 7.94 |
| 1 | 00:18:0a:b9:6d:6d | no | 1.22 |
| 1 | 00:50:56:a9:0b:bd | no | 225.80 |

Once the platform agent queries the virtual machines for Mac addresses, relationship between VM and network can be established.

Virtual machine IP address is further discovered using the existing arp-cache of the host. Assuming a VM is active on network and is sending any kind of address resolution protocol (arp) packet, arp-cache is populated and can be used to get the mac to ip address relationship.

New application programming interface (API) extension have been added to OpenStack to make sure these relationship and discovered components can be registered with the OpenStack software.

a.2: VMware Virtual Machines

To support VMware virtual machines, SAAS platform makes the portGroup or dvPortGroup correspond to "Networks".

VMware virtual machine typically uses VMware Tools to advertise IP information, SAAS platform uses the VMware Tools for the discovery of IP addresses.

b. Discovery of Existing Images:

b.1 KVM Images:

The SAAS platform has introduced a new service which searches and monitors configured file system path of certain machines to look for files with extensions such as .qcow2, .img. Once these files are found, SAAS platform uses qemu-img application to discover additional attributes of those files such as image-type, image-size, etc. API extensions to Openstack facilitate registration of these images.
Example:
qemu-img info ./ubuntu-14.04-cloudimg.img
image: ./ubuntu-14.04-cloudimg.img
file format: qcow2
virtual size: 2.2G (2361393152 bytes)
disk size: 244M
cluster size: 65536 b.2 VMware Templates:

The SAAS platform looks at 'templates' and recognizes them as 'images'. VMware has rich APIs that gives out detail about image type and the sizes and the above mentioned extension APIs are used to facilitate registration of this templates as images.

c. Discovery of Existing Virtual Machines.

c.1 KVM Virtual Machines:

The SAAS platform uses popular virtualization library and service libvirtd's api to find existing virtual machines. Libvritd has rich APIs to list all the Virtual machines on a host. It also details out for each virtual machine the storage, memory, cpu, name, network configuration and power-state. The SAAS platform gathers this information and like in other discovery component, Platform9 has added extension APIs that facilitate registering these 'discovered' virtual machine. Example listing VM through a libvirt client utility virsh is:

| >virsh list | | |
|---|---|---|
| Id | Name | State |
| 1 | instance-0000b56e | running |
| 2 | instance-0000b56f | running |
| 3 | instance-0000b571 | running |
| 5 | instance-0000b3f8 | running |
| 10 | instance-0000b572 | running |

Example snippet of details of a virtual machine using virsh is:

```
virsh dumpxml 1
<domain type='kvm' id='1'>
  <name>instance-0000b56e</name>
    <uuid>09cf3992-420c-4149-9b4c-808fbcb4ad5f</uuid>
      <memory>1048576</memory>
      <currentMemory>1048576</currentMemory>
  <vcpu>1</vcpu>
  <sysinfo type='smbios'>
```

```
<system>
    <entry name='manufacturer'>OpenStack Foundation</entry>
    <entry name='product'>OpenStack Nova</entry>
    <entry name='version'>2014.2.1</entry>
    <entry name='serial'>44454c4c-4700-105a-8048-
c4c04f445831</entry>
    <entry name='uuid'>09cf3992-420c-4149-9b4c-
808fbcb4ad5f</entry>
</system>
</sysinfo>
...
``` c.2 VMware Virtual Machines:

The SAAS platform use VMware SDK to list each virtual machine and its details just like the KVM VM. These discovered virtual machines are registered through extension APIs.

Following data structure describes a json document which is used to store the 'discovered' VMs before registering them with the software platform. This data structure is used to store the captured information that has been described above.

```
{
    'instance_uuid': ...,
    'access_ip_v4': '1.2.3.4',
    'access_ip_v6': '::babe:1.2.3.4',
    'name': 'fake instance',
    'admin_password': '0xcafebabe',
    'vcpus': 2,
    'memory_mb': 2048,
    'virtual_interfaces': [
        {
            'mac_address': '00:50:56:a9:5a:59'
            'bridge': None
        },
        {
            'mac_address': '00:50:56:a9:bd:ec'
            'bridge': 'virb0'
        }
    ],
    'block_device_mapping_v2': [
        {
            'device_name': '/dev/sdb1',
            'source_type': 'blank',
            'destination_type': 'local',
            'delete_on_termination': 'false',
            'guest_format': 'swap',
            'boot_index': -1
        },
        {
            'device_name': '/dev/sdb2',
            'source_type': 'volume',
            'destination_type': 'volume',
            'boot_index': 0
        }
    ]
}
```

In addition to the discovery, SAAS platform places the metadata about the discovered object in a 'special' tenant so that an administrator can easily identify these discovered Virtual Machines. 'Special' tenant is labeling mechanism for the discovered VMs within the SAAS platform. Once discovered, SAAS platform makes these virtual machines behave just like any other virtual machine OpenStack has created.

Certificate Authentication

In order to support many enterprise customers on their private cloud using PCSS software components, certificate authentication mechanism is needed to isolate the communication channels for each enterprise customer. Thus, this embodiment solves the above problem by allowing PCSS architecture for deployment of multiple private cloud infrastructures for many enterprise customers.

For each customer, the software platform deploys a set of services in the form of software as a service (SAAS) controller and a 'Gateway' or a 'host agent'. These services need to mutually authenticate with certificates to each other each time these components communicate with each other. This intra-service certificate authentication is necessary in order to avoid one enterprise customer spoofing data for another and in some cases causing denial of service (DOS) attack. For example, when nova-compute OpenStack component of one customer is able to communicate with nova-scheduler OpenStack component of another customer and stuffing it with false information, placement logic would fail. Adding intra-service certificate authentication also provides additional security by adding another level of trust.

When using the certificate services, any communication would fail between services deployed for different customers. For example, customer A's controller shouldn't be able to communicate with customer B's gateway and vice-versa. As more services (or instances of the services) are introduced into the system and intra-service communication between older and the newer service (instances) continue to work.

This system also allows for revocation of a given service (or as a set) in case of security breach.

Certificate Deployment and Authentication

Figure 3:
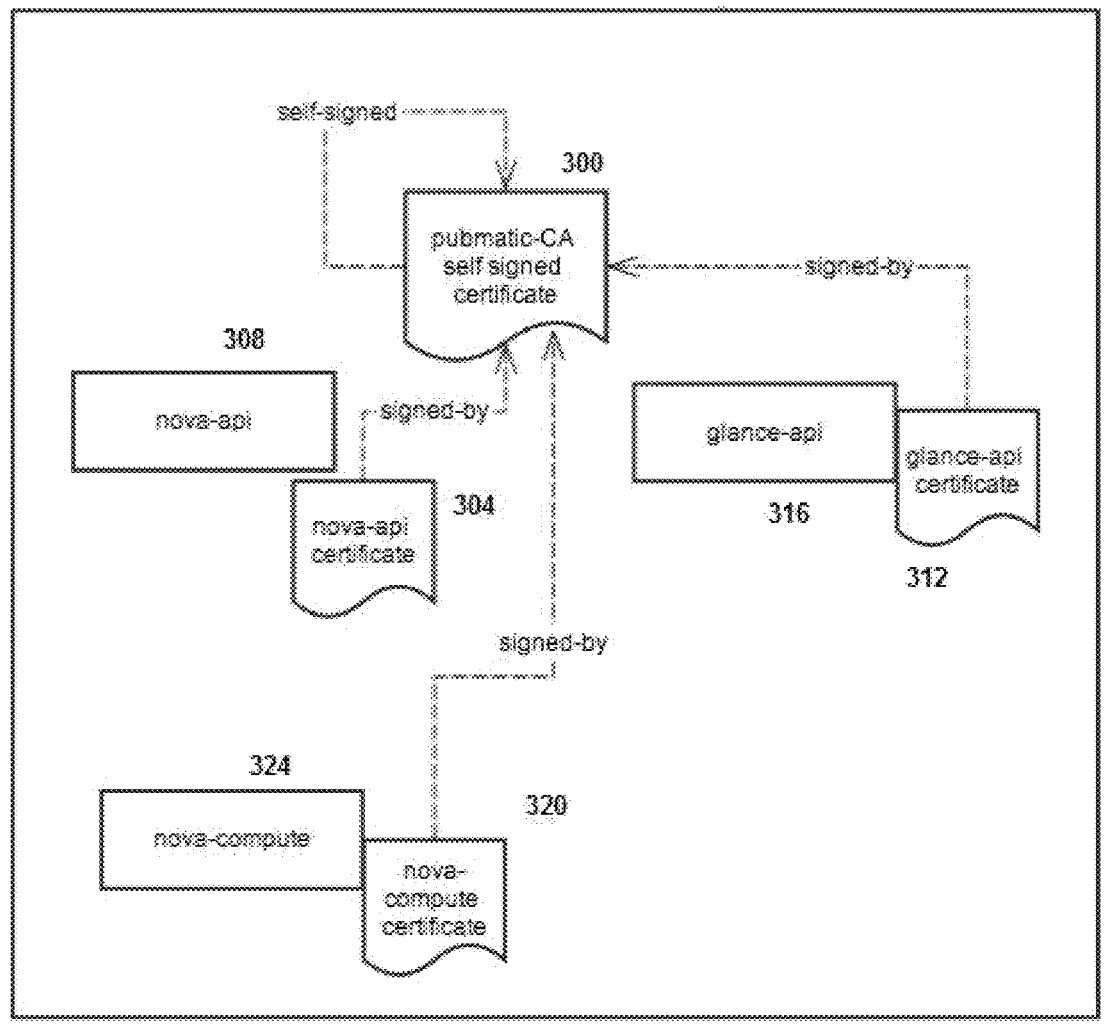
FIG. 3 depicts a work flow diagram illustrating how the certificates are generated and distributed within the OpenStack components.

FIG. 3 shows how the various signed certifications are derived from a single self-signed certificate authority. For each enterprise customer, the system will create a root 'self-signed' certificate authority (customer-CA) 300. The customer-CA is installed on a certificate server accessible from other services component. Certificate server would have a database of all the customer-CA so that when components are created for an enterprise customer, certificate server can generate a certificate for that component. Customer-CA will then be used for issuing certificates by the certificate server for services on the following components:

SAAS Controller (nova-api 304, 308, glance-api 312, 316, [not shown in FIG. 3] nova-conductor, glance-registry, keystone)

Host agent (nova-compute 320, 324, [not shown in FIG. 3] update-svc)

Gateway (glance-store [not shown in FIG. 3])

The host agent including the nova-component and the update-svc OpenStack components are installed on each server. Host agent runs on a server (typically running in the enterprise customer's data center) which is a recipient of a virtual machine (VM). Host agent is described in more detail below.

The PCSS controller is deployed on the SAAS infrastructure. Each enterprise customer has its own controller to communicate with the each of the managed servers, which run the host agents. Each component (and hence services) will get the copy of the certificate installed on them. This means all the 'factories' need to consult the public certificate server 300 and get corresponding certificate when creating the PCSS components.

PCSS Controller contains all the PCSS components that the platform wishes to deploy to enable PCSS-based private cloud. In an OpenStack example, this will include components such as horizon, keystone, nova-api, nova-scheduler, glance-api, glance-registry, etc.

Any OpenStack components such as nova-compute deployed on-premise in the customer data center (as part of application stack) will initiate connection with the OpenStack controller to register with the Controller as compute nodes.

The communication among various OpenStack services such as nova-compute 324 and nova-api 308 is authenticated using the generated certificates 304, 320. The intra-service mutual certificate authentication would work courtesy of the customer-CA 300. This also ensures that gateway/controller of one enterprise customer cannot communicate with the gateway/controller of another.

Host Agent Deployment with Certificate Installation

Each host agent installable component would be bundled with a certificate issued certificate server as the customer-CA. Host agent installation procedure follows the same mechanism described in FIG. 2 except in this case; the discussion is focused on the certification installation. The host agent installation would contain all the information needed to communicate with the other OpenStack components. When the host agent is installed on a server on-premise in the enterprise customer's data center, the certificate would be installed also.

When the host agent boots up and start communicating with the SAAS controller, agent passes the certificate to the customer SAAS controller. This can be achieved by setting up a communication channel from the internal end-point (agent installation inside the enterprise infrastructure) to the externally visible endpoint (SAAS controller).

SAAS controller in turn checks if the certificate matches its own certificate. If the agent's certificate is not authenticated, the agent won't be able to communicate with the customer SAAS controller. Once the SAAS controller is able to communicate with the agent, the SAAS controller can monitor the status of the server as well as send updates to the OpenStack software and the agent software. The SAAS controller can also update various configurations on the manage server using the agent communication.

In additional certificate authentication responsibility, each agent installation can also host an Online Certificate Status Protocol (OCSP)/certificate revocation list (CRL) list for revocation of digital certificate on the deployed services. This allows the system to stop communicating with the components on an agent once the certificate on that agent has been revoked.

Multiple Channel Data Communications Through Firewall

When a SAAS platform communicating with servers within a data center, SAAS platform must communicate with these servers through a firewall. A firewall allows only a certain types of traffic to pass through the firewall typically traffic on port 80. The SAAS cloud software has different types of communications which are required to be sent to the data center servers. This embodiment of the invention allows a SAAS platform to communicate multiple different types of communication with data center servers through a firewall—a proxy and a network address translation (NAT). The general strategy is to encapsulate multiple communication channels of different types over an equal or smaller number of "carrier" connections of a single type. There exist several methods for achieving this encapsulation: (1) hypertext transport protocol (HTTP) 1.1 WebSockets, (2) Transport Layer Security/Secure Sockets Layer (TLS/SSL)+Server Name Indication (SNI), and (3) TLS/SSL+HTTP2. This document describes the first in detail, and will later briefly mention the other two.

Figure 4:
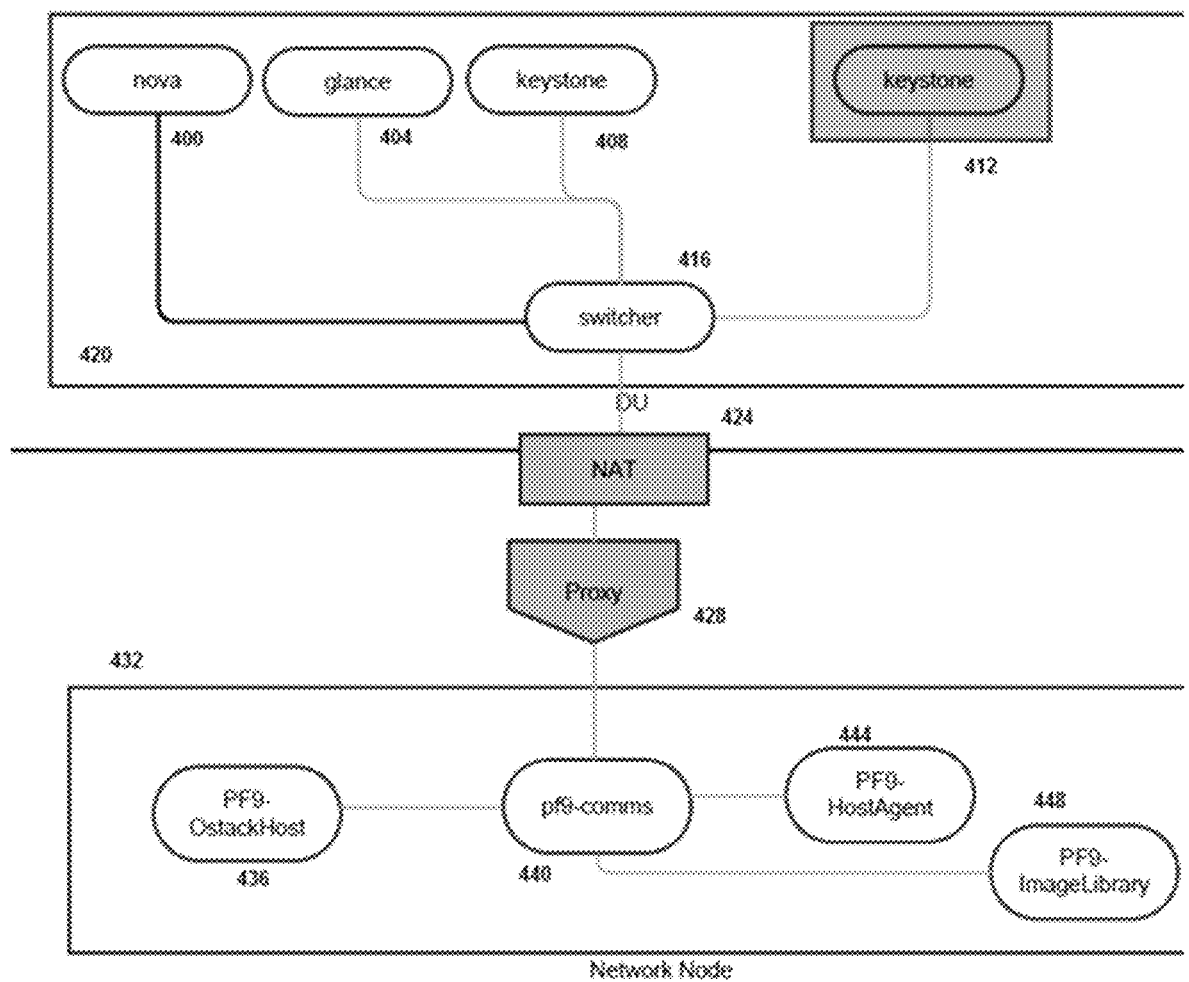
FIG. 4 depicts how to provide SAAS based communication through a firewall to data center servers.

FIG. 4 shows a description of how the software platform communicates with the host when using the first encapsulation method, which uses HTTP1.1 and WebSockets for the carrier connections. A communication module installed on one or more node within the data center is able to act as a tunnel to route traffic through a proxy and NAT. This communication service act as a HTTP, or TCP Server which serves traffic on a "local" server. The communication module uses WebSocket-like protocol and plain secure hypertext protocol (HTTPS) to connect to its pair "switcher" in the SAAS environment (the deployment unit or DU).

Figure 5:
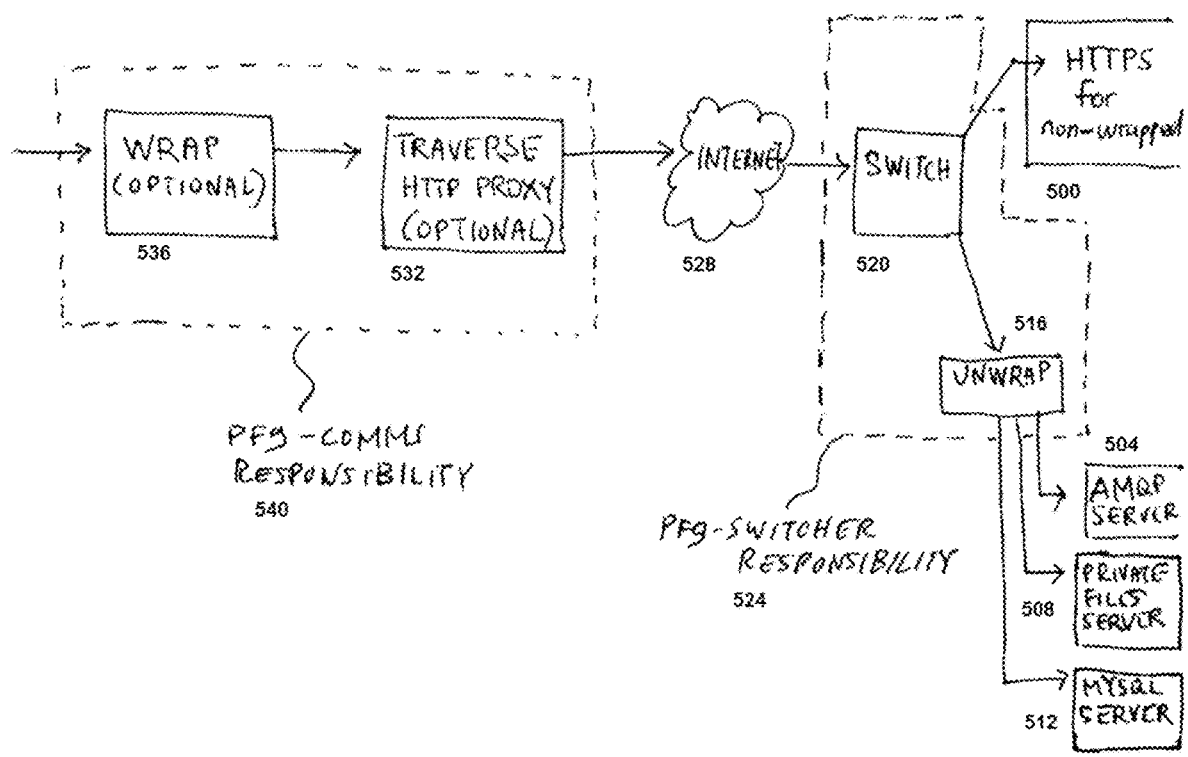
FIG. 5 depicts a detailed version of how the communication data is routed through the pf9-comms and pf9-switcher components across the SAAS service and the data center servers.

FIG. 5 depicts the data flow through the communications subsystem between the SAAS platform and the host agent composed of pf9-comms and pf9-switcher. The subsystem categorizes communications in two major types: HTTPS and "Other". HTTPS means the HTTP protocol running over the TLS/SSL protocol. HTTPS 500 is used to expose the SaaS web user interface (UI) and web/representational state transfer (REST) APIs. The "Other" major type includes subtypes for other protocols, such as binary protocols. Examples of binary protocols used by SAAS platform are advanced message queuing protocol (AMQP) 504 and MYSQL 512. On the SAAS platform side, each of those protocols is handled by a service or server process, for example RabbitMQ for AMQP 504, file server 508, or Mysql Server for MYSQL 512.

The flow begins when a local client connects to pf9-comms on a particular local port. Pf9-comms has two sets of configuration parameters that loaded from a configuration and stored in memory. The first set specifies whether the customer requires outgoing traffic destined for the internet to route through an HTTP proxy. If required, the set includes the proxy's IP address and Transmission Control Protocol (TCP) port. The second set is a configuration table specifying how incoming client traffic on a local port is to be processed, as illustrated in Table 1.

TABLE 1

| Local Port | Requires Wrapping? | Wrapping Tag (Subtype) |
|---|---|---|
| 8443 | No | |
| 5671 | Yes | ampq |
| 9443 | Yes | privatefiles |
| 3306 | Yes | mysql |

Description below describes both FIG. 4 and FIG. 5. The first column contains the local port, which reflects the protocol, or communication type, chosen by the client. Pf9-comms 540 applies a transformation called "wrapping" 536 to distinguish between HTTPS and "Other" protocols. The second column specifies whether wrapping is required, and if the answer is yes, then third column specifies a tag used to distinguish between the different subtypes of wrapped communications.

Pf9-comms 440 processes an incoming connection as follows. First, if the configuration requires routing through a proxy 532, pf9-comms establishes an outgoing connection to the proxy 532, then requests it to establish another connection to the switcher service 416, 520 listening on the SaaS system at port 443. From that point on, the proxy joins the two connections and relays network traffic back and forth between pf9-comms and the SaaS system. If a proxy is not required, then pf9-comms 440 establishes a direct outgoing connection to the switcher 416, 520.

Next, wrapping is applied if the configuration table specifies so. The wrapping transformation appends a block of data called preamble to the client's data to distinguish it from TLS/SSL, the low-level protocol used by HTTPS. The preamble also contains the wrapping tag in order to identify the protocol subtype. In one preferred embodiment, pf9-comms uses a plain HTTP request with an UPGRADE header as the preamble. As specified in the HTTP 1.1 specification, the UPGRADE header indicates a request to upgrade from HTTP to a binary protocol. Pf9-comms 440 takes advantage of the HTTP request's "URL path" component to encode the wrapping tag. For example, the URL path for an incoming connection on port 5671 would be "/amqp". Once the preamble is constructed, it is sent over the outgoing connection, and pf9-comms waits for an HTTP response from switcher 416, 520. If pf9-comms receives successful UPGRADE response from switcher, then it starts sending the client's data and relaying any data flowing from the other direction back to the client. This back-and-forth relaying continues until one side closes its connection. When a connection close event is detected on any end of any segment of the, the end which detected the close event asks the other end of the connection to close itself. Once the other end closes, it send a message to the other end to close the connection. If wrapping is not required, then there is no preamble, and pf9-comms starts sending the client's data immediately and relaying.

Through this mechanism, any arbitrary traffic can be routed through the data center's proxy or NAT configurations.

When switcher handles an incoming connection on port 443, it reads a small number of bytes from the incoming stream to determine the protocol major type. If those bytes contain a TLS/SSL header, then switcher assumes that the protocol is HTTPs, establishes a link to the HTTPS service/server, forwards the client traffic (including the initial bytes read) to the service, and relays data back and forth between the two sides until one side closes its connection. If switcher cannot identify an HTTPS connection, it tries to interpret the incoming data as an HTTP request. If the request is correctly formatted as a preamble as defined above, then switcher extracts the protocol subtype tag from request's URL path, and looks it up in a configuration table that looks like the one illustrated in Table 2.

TABLE 2

| Subtype tag | Destination host | Destination port |
| --- | --- | --- |
| amqp | localhost | 5671 |
| privatefiles | localhost | 9443 |
| mysql | cust1.mysql.platform9.sys | 3306 |

If the tag is found in the first column, switcher establishes an outgoing connection to the service located on the host and port specified by the second and third columns. If the connection is successful, then switcher removes the preamble from the incoming data stream, joins the stream to the outgoing connection, and replies to the client with a successful HTTP UPGRADE response. Further traffic will flow bi-directionally between the client and the service until one side closes its connection.

There are two other embodiments that use a different encapsulation method. The one based on TLS/SSL+SNI takes advantage of a feature of the TLS/SSL protocol called Server Name Indication. In this embodiment, pf9-comms makes a TLS/SSL connection to pf9-switcher. During the protocol handshake, pf9-comms sends the desired channel subtype tag as the "Server Name" data field of the SNI feature. On the receiving side of the communication, pf9-switcher decodes the tag from the Server Name, and forwards the channel to the corresponding destination server. Another embodiment is to use the HTTP2 virtual streams rather than HTTP 1.1 protocol stack. Here, individual communication channels are established as separate virtual streams, with the subtype tag encoded as the virtual stream name. Acting as an HTTP2 server, pf9-switcher would use the stream name to decide where to forward the stream.

Alternative Communication Channel and Control Agent

The pf9-sidekick (sidekick client) service provides an alternate control channel and agent for troubleshooting and repairing failed host upgrades or other loss of communications situations. It exposes functionality equivalent to host agent, thereby allowing the host to be managed even when the host agent stops working. Furthermore, it directly establishes a communication channel to pf9-switcher without using pf9-comms, thereby isolating itself from pf9-comms failures as well.

Pf9-sidekick service is packaged with pf9-comms, and runs on the host at all times. The pf9-comms service acts as a watchdog for pf9-sidekick service, checking pf9-sidekick every 5 minutes and starting it if necessary.

After a pf9-comms upgrade or removal, the pf9-sidekick process does NOT automatically restart and continues to run. This allows pf9-sidekick to be relied upon in emergency situations, even if its code, configuration files or certificates have been destroyed or corrupted. If, after an upgrade, both pf9-comms and host agent cease to function, there is a good probability that pf9-sidekick is still functioning.

To protect against pf9-comms failures, sidekick bypasses pf9-comms and directly establishes a communication channel through pf9-switcher and finally to the pf9-sidekicksry server on the DU. Sidekick client reads the DU's network location and proxy information from the same host agent and pf9-comms configuration files. Pf9-sidekick tags the channel with its own subtype tag named "sidekick", allowing pf9-switcher to recognize it and forward the channel to the pf9-sidekicksry server on the DU.

The sidekick server controls the sidekick client by sending it commands. The sidekick client accepts a command set similar to that of host agent. The commands include: install software, configure software, report system health data, create and send back a support bundle file containing log files and system information, and run specific troubleshooting or repair commands on the host operating system.

All examples and conditional language recited herein are intended for educational purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents hereof. Additionally, it is intended that such equivalents include both currently known equivalents as well as equivalents developed in the future, i.e., any elements developed that perform the same function, regardless of structure.

We claim:

1. A computer implemented method for provisioning of a private cloud stack on a host via at least one host-agent comprising steps of:

installing a host-agent software on the host;
authenticating credentials provided by a user to the at least one host-agent via a resource manager as part of the private cloud stack,
connecting the at least one host-agent to the resource manager using the credentials provided by the user;
communicating configuration information about the host, wherein the configuration information includes dynamic template parameters such as Internet Protocol (IP) addresses, ethernet devices, storage information, operating system version about the host;
configuring an identity of the connected host-agent as a legitimate host and confirming usage of the host for further communication;
negotiating permanent credentials in a form of certificates at the host for the connected host-agent;
receiving a message about a desired role and a desired configuration for the dynamic template parameters for the host from the resource Manager; and
receiving a further message to install a monitoring software from the resource Manager;
and
self-healing an underlying configuration on the host, if a configuration drift occurs by reverting back to a well-known desired configuration;
configuring an optimal configuration by:
  installing binaries corresponding to the desired role;
  configuring the binaries with the corresponding optimal configuration;
  running the services associated with the desired roles via the Host agent;
  continuously monitoring binaries;
  sending health statuses of different roles/services installed by the host agent and configuration of the desired roles and configurations upon successful installation;
  retrieving a host configuration and reporting to the resource manager through a role based installation of additional scripts;
  enabling with a self-serving virtual machine provisioning and management in the private cloud stack; and
  storing, a network request within the self-serving virtual machine;
sending host agent statuses and configuration statuses to the resource manager to mark installation of the desired role as complete and notifying an Application Peripheral Interface (API).

2. The computer implemented method in claim 1,
wherein receiving the messages for dynamic template parameters is repeated for a plurality of hosts via the host agents using a resource manager configuration; and
wherein receiving the messages for dynamic template parameters allows to manage the plurality of hosts by allowing for templating commonly used configurations as constants and variable bits of information derived from the configuration provided by the host agent status and configuration statuses.

3. The computer implemented method in claim 1, wherein host agent install on an enterprise computing machine.

4. The computer implemented method in claim 1, wherein the private cloud stack is provisioned from a public cloud on at least one computer processors further comprises:
activating each private cloud stack's control plane services in the public cloud;
enabling each private cloud stack's roles for data plane elements:
reading a metadata to setup control plane elements as connection destinations;
activating a stack via an account manager;
receiving a host agent connection request;
connecting the host agent to the resource manager;
authenticating the host agents using embedded keys and certificates to a customer account manager;
receiving a host related information from the host agent:
receiving a selected role for the host agent via a user interface UI:
receiving a host authorization via the UI;
pushing a desired state for a particular host agent to the host agent via the account manager:
installing components on the enterprise machine associated with a role via the host agent; and
configuring the installed components using templates and the dynamic template parameters.

5. The computer implemented method in claim 4, further comprises:
registering the installed private cloud stacks discovering name, version, release date and other information about software packages associated with each computer processor of the at least one computer processor;
activating a private cloud stack's control plane services in public clouds by using either the available Application Program Interfaces (APIs) for public cloud services or using the installed components; wherein discovered infrastructure resources such as compute, storage, network of the public cloud and their attributes are accessed using a human provided access credentials, or using a installed host agent on compute instances of the public cloud;
enabling the private cloud's data plane elements like compute, storage, network by controlling their behavior for purposes of security, performance and other functional aspects using snapshotting, copying, configuring or creating a new compute, storage or a network resource; and
controlling additional activations via the account manager to manage and configure registered private cloud by registering multiple accounts corresponding to different organizational units to discover their compute, storage, network resources and attributes.

6. The computer implemented method in claim 5, further comprises:
monitoring each private stack component for an installed component version and their running state;
for each installed component, receiving continuous configuration updates and applying the configuration onto the component;
checking health statues of the installed component based on heartbeat messages for the account manager; and
providing a notification alerts via the UI for a heartbeat, component install or configuration failures.

7. The computer implemented method in claim 1, further comprises:
receiving a new version of the private cloud software stack (PCSS) via a resource manager;
requesting the account manager to move a configuration to use the new version of the private cloud software stack;
sending a further message to the host agent to update itself, wherein the host agent further comprises:
downloading the new version of a host agent binary and configuration;
upgrading the host agent binary and configuration; and
restarting the host agent with the newer version;
upgrading a security certificate whenever a new security certificate is available;
sending a further message to re-authenticate the host agent with the account manager;
sending a further message to upgrade other components via the account manager;

receiving a host information from the host agent;
receiving authorization of the host information via a User Interface (UI);
receiving a role upgrade information selection optionally for the host agent via the UI;
sending a desired state to the host agent via the account manager;
uninstalling and removing the PCSS components where an existing version of PCSS component is installed;
installing the PCSS components on enterprise machine associated with role;
and configuring the installed components using templates and dynamic template parameters.

8. The computer implemented method in claim 7, further comprises:
monitoring an installed component version for their running state;
receiving continuous configuration updates for the installed components;
receiving continuous heart beat messages for account manager;
receiving health statuses of components installed messages for the account manager;
receiving a configuration health of the components installed messages for the account manager; and
displaying visual alerts via the UI for a heartbeat component install or configuration failures.

\* \* \* \* \*